United States Patent [19]

Shiomi et al.

[11] Patent Number: 5,023,647

[45] Date of Patent: Jun. 11, 1991

[54] AUTOMATIC STATUS DISCRIMINATOR

[75] Inventors: Yasuhiko Shiomi, Tokyo; Takayuki Tsuboi, Yokohama, both of Japan

[73] Assignee: Canon Kabushiki Kaisha, Tokyo, Japan

[21] Appl. No.: 455,906

[22] Filed: Dec. 20, 1989

Related U.S. Application Data

[63] Continuation of Ser. No. 361,697, Jun. 1, 1989, abandoned, which is a continuation of Ser. No. 273,104, Nov. 18, 1988, abandoned, which is a continuation of Ser. No. 191,752, May 5, 1988, abandoned, which is a continuation of Ser. No. 5,765, Jan. 21, 1987, abandoned.

[30] Foreign Application Priority Data

Jan. 21, 1986 [JP] Japan ................................ 61-10656

[51] Int. Cl.$^5$ .......................... G03B 7/08; G03B 15/05
[52] U.S. Cl. ...................................... 354/414; 354/433
[58] Field of Search ............... 354/402, 403, 414, 415, 354/419–423, 429–434; 356/221, 222

[56] References Cited

U.S. PATENT DOCUMENTS

| | | | |
|---|---|---|---|
| 3,583,299 | 6/1971 | Land | 354/421 X |
| 3,836,920 | 9/1974 | Uchiyama et al. | 354/414 |
| 3,855,601 | 12/1974 | Uchiyama et al. | 354/414 |
| 4,063,257 | 12/1977 | Mashimo et al. | 354/433 X |
| 4,664,495 | 5/1987 | Alyfuku et al. | 354/430 |

FOREIGN PATENT DOCUMENTS 56-89728  7/1981  Japan .

Primary Examiner—W. B. Perkey
Attorney, Agent, or Firm—Fitzpatrick, Cella, Harper & Scinto

[57] ABSTRACT

An automatic status discriminator has a distance measuring unit for calculating the distance to a target object to provide a signal corresponding to the distance. A reflection coefficient calculation unit calculates the reflection coefficient of the target object on the basis of the signal provided from the distance measuring unit. A light intensity measuring unit provides signals respectively corresponding to the brightness of the target object and the brightness of a region near the target object. An adjusting unit adjusts the signal corresponding to the brightness of the target object on the basis of the reflection coefficient obtained from the reflection coefficient calculation unit to provide the adjusted signal. A status discriminating means compares the signal corresponding to the brightness of the region near the target object with the output from the adjusting unit to thereby discriminate the status of the target object.

31 Claims, 6 Drawing Sheets

AUTOMATIC STATUS DISCRIMINATOR

This application is a continuation of application Ser. No. 361,697 filed on June 1, 1989, which is a continuation of Ser. No. 273,104 filed on Nov. 18, 1988, which is a continuation of Ser. No. 191,752, which is a continuation of Ser. No. 191,752 filed on May 5, 1988, which is a continuation of Ser. No. 005,765 filed on Jan. 21, 1987, all now abandoned.

BACKGROUND OF THE INVENTION

1. Field of the Invention

The present invention relates to an automatic status discriminator which can be mounted on a camera, unattended monitoring instrument, unattended recorder or monitor robot, and more particularly to an automatic status discriminator which can exactly discriminate the status of light illumination of an object or target to be observed (for example, a forward light scene, or a counter-light scene, i.e. a back lit light scene).

2. Related Background Art

Most new cameras have automatic exposure control devices (AE devices) so that users of the cameras can easily and quickly take photographs without being forced to make a troublesome exposure determination. However, in a camera with the AE device, there is no room for judgement by the camera user in determining the exposure and the AE device must have a function of determining photographing status. The determination of the photographing status includes a determination of a forward light scene or counter-light scene and a determination of a main object and a sub-object (for example, background) in the scene. As is well known, the exposures of the camera in the forward light scene and the counter-light scene must be set to totally different values even if the objects in those scenes are detected to have the same brightness. However, if the AE device has no function to discriminate those scenes, the same exposure will be given to both scenes and the photographing will fail to produce good results.

A camera with the AE device which has such a status discriminator has been proposed and put into practice. The status discrimination in the AE device of such camera uses a brightness comparison method. The AE device measures a photographing view field by a plurality of photo-detectors, compares the light intensity of a main object with the light intensity of a sub-object to determine if a photographing status is a forward light scene or a counter-light scene, and if it is the counter-light scene, a stroboscope is operated even in a daylight photographing mode or an alarm is generated to indicate need of stroboscope photographing mode.

However, since the known AE device having the above status discriminator pays no attention to a reflection coefficient of the object, it cannot exactly discriminate the status.

As is well known, the brightness of an article is proportional to the product of an intensity of an incident light to the article and the reflection coefficient of the article. Thus, if the brightness is measured, it includes the mixture of the intensity of the incident light to the article (which varies depending on forward light or counter-light) and the reflection coefficient of the article. It is, therefore, difficult, in some cases, to determine whether the object is in the forward light status or counter-light status, based on the measurement.

For example, if a main object is a man who wears a dark suit in a forward light scene with a light background and it is photographed, the AE device, in many cases, determines that the scene is a counter-light scene and a stroboscope is activated.

In the known AE device having the brightness comparison type status discrimination function, it cannot determine whether the reflection coefficient of a main object is low or it appears dark because of counter-light. Accordingly, if a photograph is taken by the camera with such an AE device under the situation described above, it is always photographed in a daylight synchronous photographing mode and a camera use has a feeling of unreliability of the camera with AE device.

Especially, the above defect is more pronounced as the size of the light intensity measuring spot to the main object is reduced. In the light intensity measurement, of the AE device, the smaller the size of the intensity measuring spot is, the more convenient to photograph a small object (or to far-distance photographing). Accordingly, the small size of the light intensity measuring spot is preferable. However, if the light intensity of a big object (or a far-distance object) is measured with a small area spot, the possibility that all over the light intensity measuring portion is overlapped with a simple pattern of the object increases, so that the affect due to of the reflection coefficient of the object increases. As a result, it is difficult to make a correct determination by the status discrimination system.

SUMMARY OF THE INVENTION

It is an object of the present invention to provide a novel automatic status discriminator which is free from a defect encountered in a brightness comparison type status discrimination system used in a prior art AE device.

The automatic status discriminator of the present invention determines the reflection coefficient of a target object based on measurement of a distance to the target object, corrects the brightness of the target object by the reflection coefficient, and determines whether the target object is in a forward light scene or a counter-light scene by comparison of the corrected brightness of the target object and the brightness of a surrounding object.

In an embodiment of the present invention, the present device is arranged over a portion of a range finder circuit of an AE device (auto-focus device) mounted on a camera and a portion of a light intensity measuring circuit of the AE device, and it operates as follows. The reflection coefficient of the main object is determined based on the measurement by the range finder circuit, the reflection coefficient is corrected by the main object brightness measured by the light intensity measurement circuit, the corrected main object brightness is compared with the sub-object brightness, and if the former is larger, it is determined as the forward light, and if the latter is larger, it is determined as the counter-light. The calculation of the reflection coefficient of the object from the measured distance is based on the following theory.

Although a light flux from the target object to the detector is proportional to (the intensity of incident light flux to target object) x (reflection coefficient of target object) x (distance to target object)$^{-2}$, (the intensity of the incident light flux to the target object) is obtained by projecting a signal light having a predetermined intensity and receiving the light reflected from the target object, and (the distance to the target object)$^{-2}$ is obtained by measuring the distance to the target object. Accordingly, the reflection coefficient of the target object can be obtained by correcting the output signal of the detector by the square of distance. Thus, since the reflection coefficient of the main object is determined in this manner, a value proportional to an incident light flux to the main object is determined by correcting the brightness of the main object by the reflection coefficient. As a result, whether the main object is in the forward light scene or counter-light scene can be exactly determined.

DESCRIPTION OF THE PREFERRED EMBODIMENTS

The present invention is applied to a camera in the following embodiment.

Figure 1:
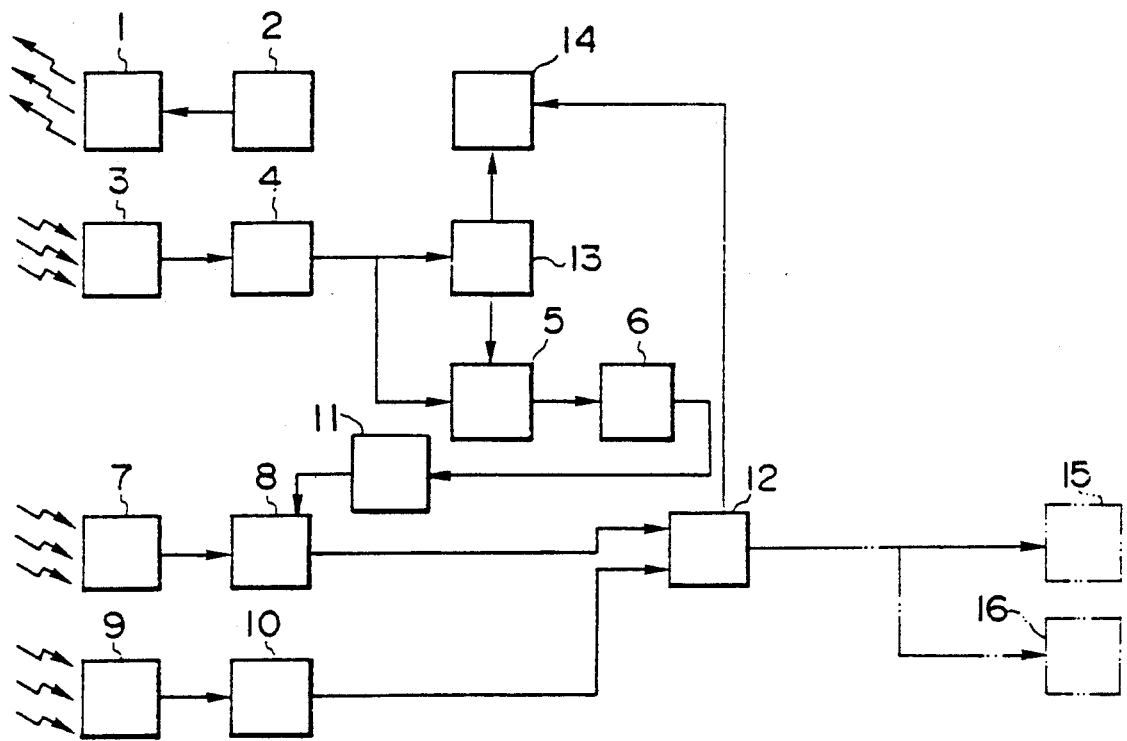
FIG. 1 shows a configuration of one embodiment of the status discriminator of the present invention.

FIG. 1 shows a block diagram of the device of the present invention applied to the camera.

In FIG. 1, numeral 1 denotes a light emitting device for emitting an infrared ray, used as a signal light, to a target such as an object, numeral 2 denotes a light emission control circuit for controlling the light emitting element 1, numeral 3 denotes a photo-detector to which the infrared ray reflected by the target such as object is applied, numeral 4 denotes a range finder circuit for detecting the distance to the object based on an electrical signal produced by the photo-sensor, numeral 5 denotes a reflection light level detector which detects the level of the reflected light which is obtained by cancelling the factor of (a distance to the object)$^{-2}$ (based on the distance information stored in the memory circuit 13) from the brightness of the object obtained through the range finder circuit 4, numeral 6 denotes an object reflection coefficient circuit which determines the object reflection coefficient based on the output of the reflected light level detector 5, numeral 7 denotes a first light intensity detector for generating an electrical signal representing the incident light intensity from the main object, numeral 8 denotes a first light intensity measuring circuit for measuring the brightness of the main object based on the signal of the first light intensity detector 7, numeral 9 denotes a second light intensity detector which produces an electrical signal representing the incident light intensity from the sub-object such as a background, numeral 10 denotes a second light intensity measuring circuit for measuring the brightness of the sub-object based on the output signal of the second light intensity detector 9, numeral 11 denotes a main object brightness correction circuit which corrects the output of the first light intensity measuring circuit 8 (the brightness of the main object) by the output of the object reflection factor calculation circuit 6, numeral 12 denotes a brightness difference calculation circuit which calculates the difference (or ratio) of brightnesses of the main object and the subobject based on the output of the first light intensity measuring circuit 8 and the output of the second light intensity measuring circuit 10, numeral 13 denotes a memory for storing the distance information produced by the range finder circuit 4, and numeral 14 denotes a display circuit for displaying the distance and the counter light scene information, etc. Numerals 15 and 16 denote a shutter control circuit and a stroboscope charge circuit, respectively, which are controlled by the output of the brightness difference calculation circuit 12.

In FIG. 1, the light emitting device 1, light emission control circuit 2, photo-detector 3, range finder circuit 4, memory 13 and display circuit 14 may be also used as an automatic range finder which is a measurement section of an auto-focus device. The first and second light intensity detectors 7 and 9 and the first and second light intensity measuring circuits 8 and 10 may be used as a measurement section of an automatic exposure control device. Thus, the camera equipped with the status detector of the present invention is equipped with the automatic exposure control function and the automatic focusing function and also equipped with the status discrimination function for automatically discriminating the forward light scene and the counter-light scene.

Figure 2:
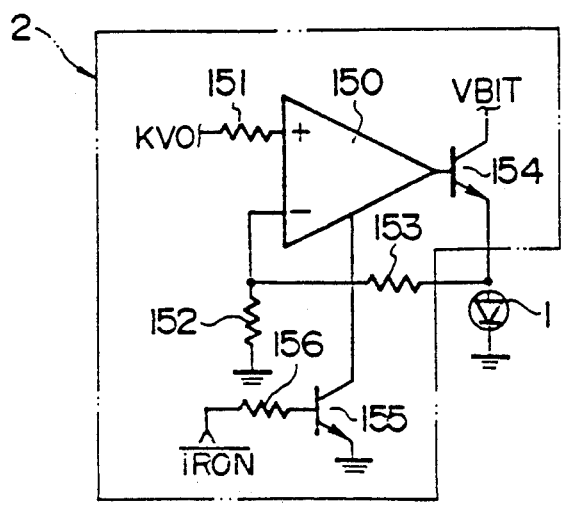
FIGS. 2 to 5 show circuit diagrams of a specific embodiment of the device of FIG. 1.

FIG. 2 shows the light emitting elements 1 and the light emission control circuit 2 shown in FIG. 1.

Figure 3:
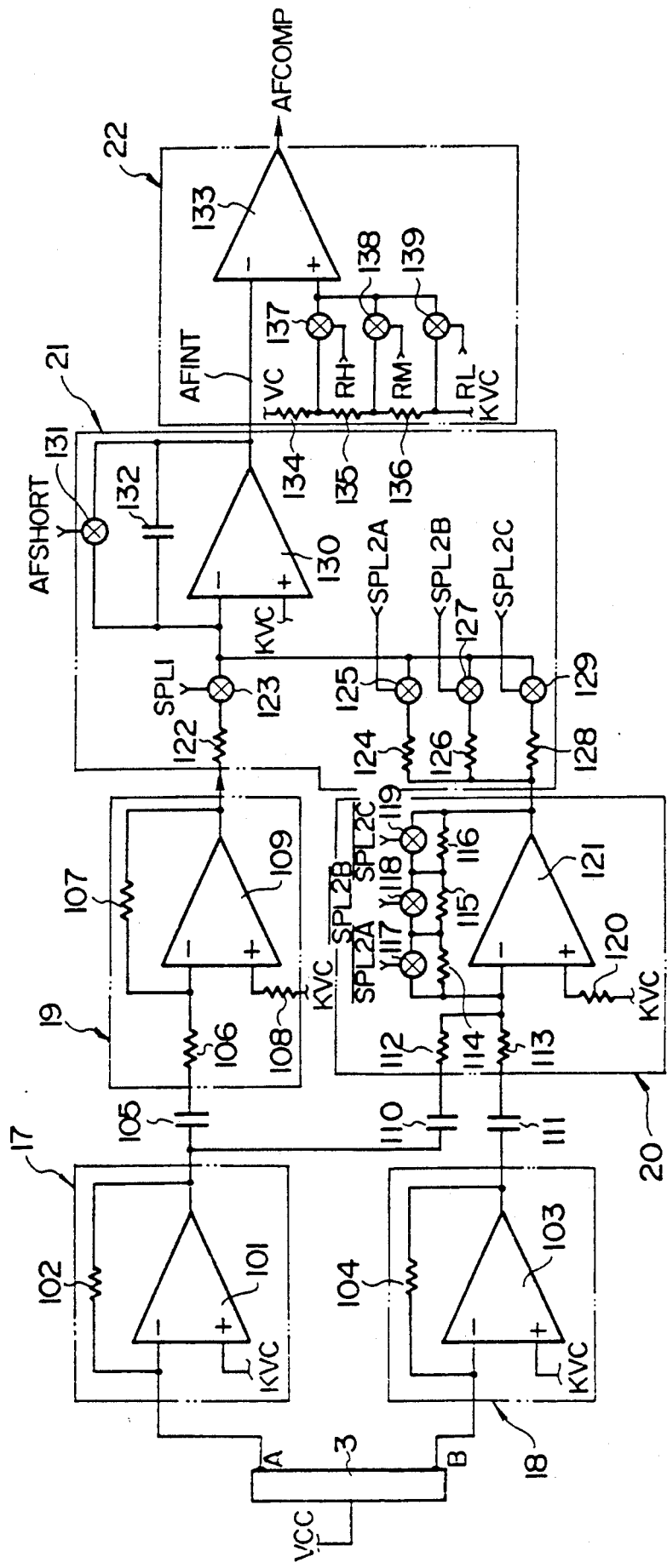
Figure 4:
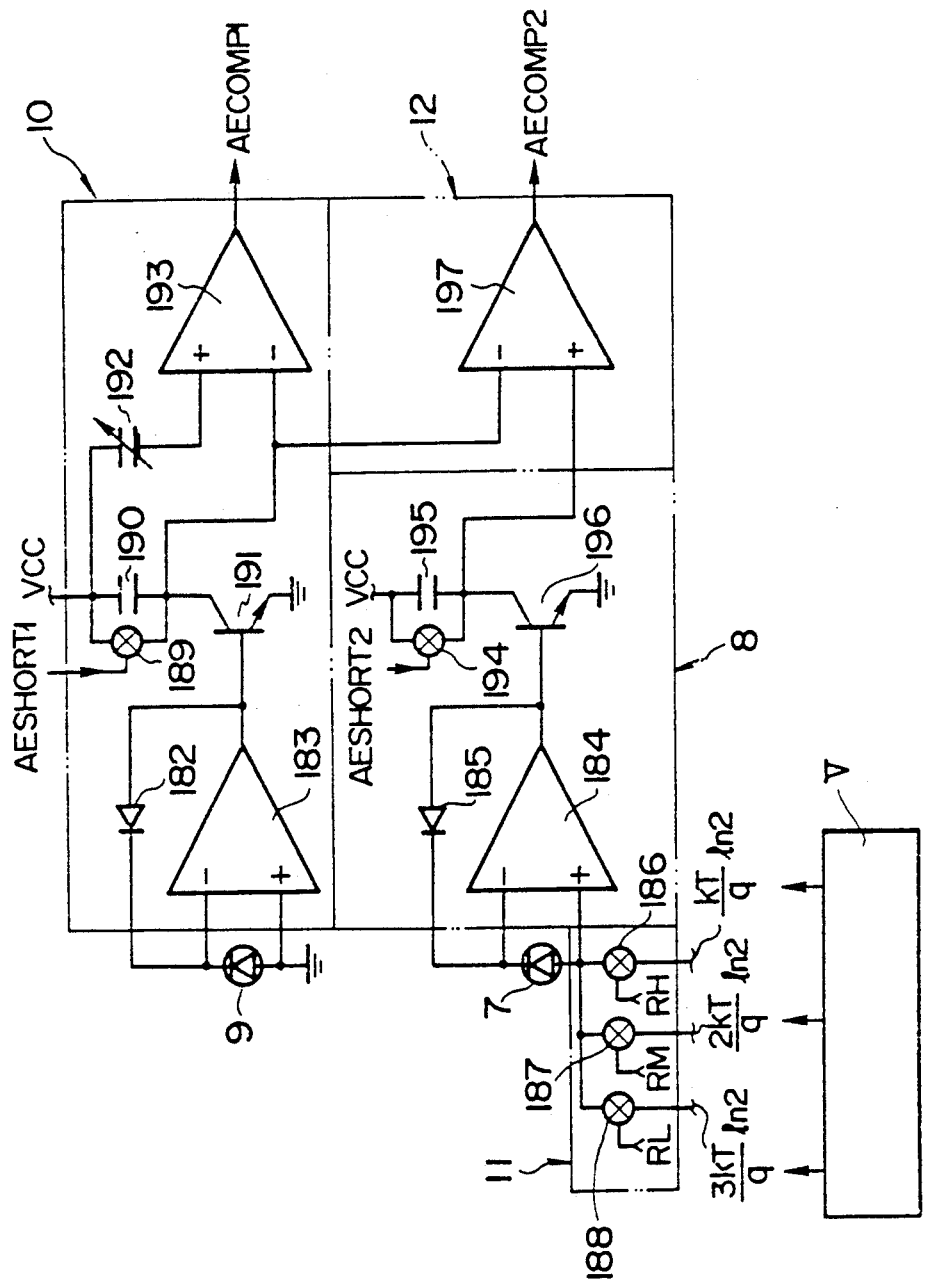

FIG. 3 shows a circuit diagram of the photodetector 3, range finder circuit 4, reflected light level detection circuit 5 and reflection coefficient calculation circuit 6, shown in FIG. 1. FIG. 4 shows a circuit diagram of the first and second photo-detectors 7 and 9, first and second light intensity measuring circuits 8 and 10, main object brightness correction circuit 11 and brightness difference calculation circuit 12, shown in FIG. 1.

Figure 5:
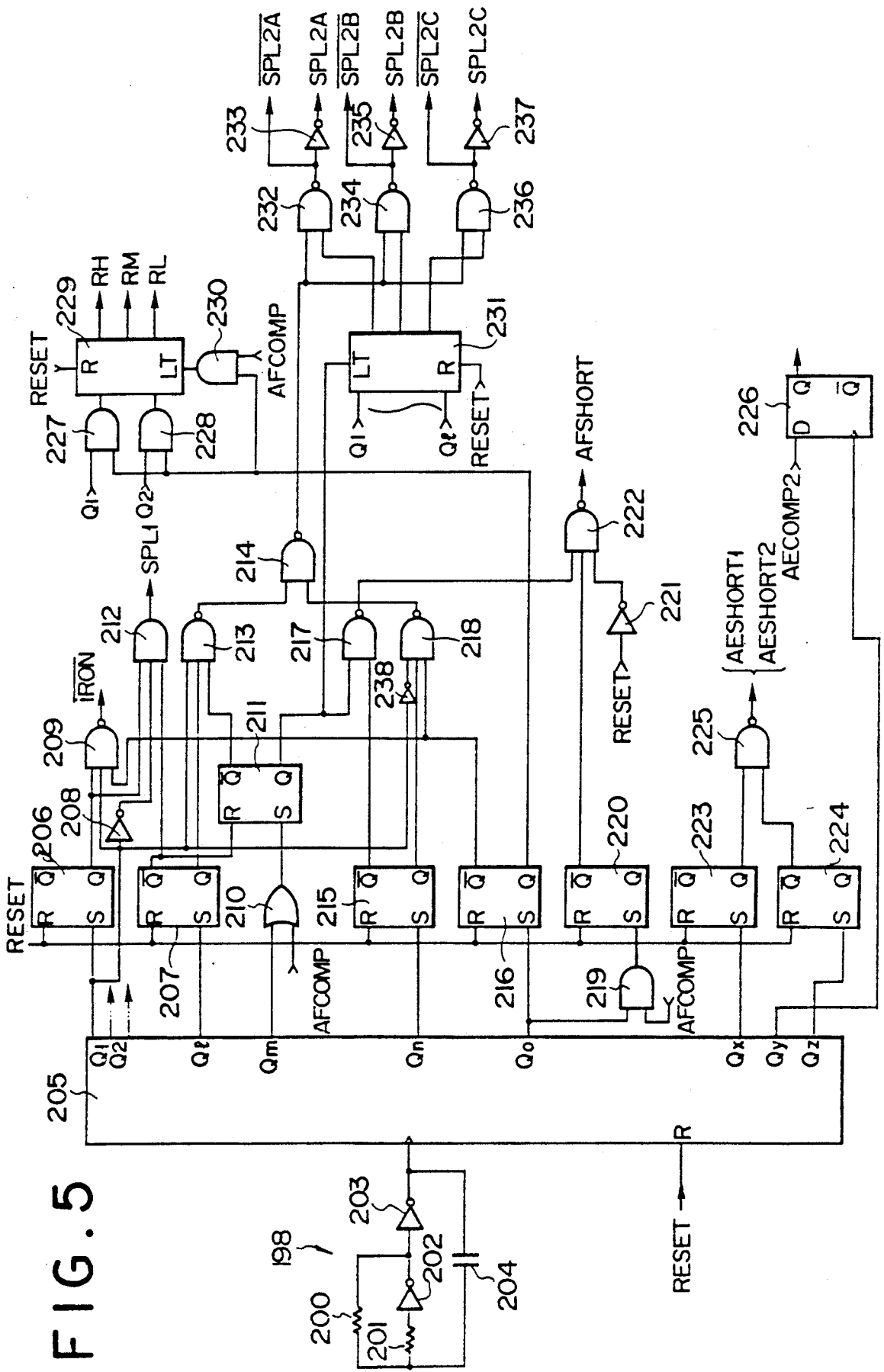

On the other hand, FIG. 5 shows a circuit which includes portions of the light emission control circuit 2, range finder circuit 4, reflected light level detection circuit 5, object reflection coefficient calculation circuit 6 and main object brightness correction circuit 11, and controls an operation sequence of the above circuits.

Figure 6:
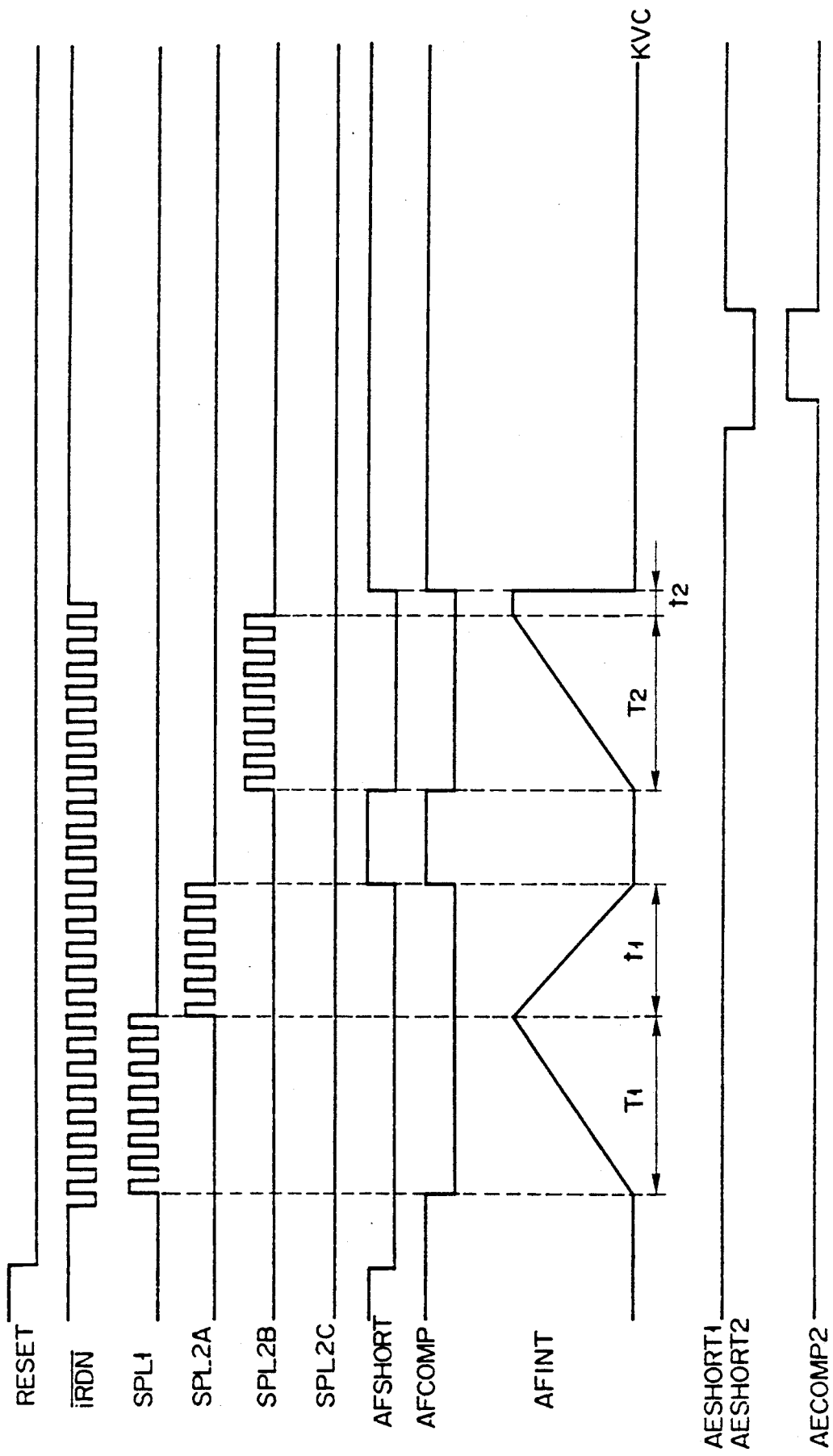
FIG. 6 shows signal waveforms and time chart in the circuits shown in FIGS. 2 to 5.

FIG. 6 shows a time chart of major signals in the circuits shown in FIGS. 2 to 5.

The circuits shown in FIGS. 2 to 5 are now explained.

FIG. 2

As shown in FIG. 2, the light emitting element 1 comprises an infrared ray emitting diode, and the light emission circuit 2 which controls the light emitting element 1 comprises an operational amplifier (OP amplifier) 150, a transistor 154 driven by the OP amplifier 150, a transistor 155 for driving the OP amplifier 150 and resistors 151–153 and 156. An output signal $\overline{\text{IRON}}$ of a NAND gate 209 shown in FIG. 5 is applied to a base of the transistor 55 connected to a strobe terminal of the OP amplifier 50 through a resistance 156.

FIG. 3

In FIG. 3, the photo-detector 3 comprises an element such as a PSD which produces an output current in accordance with a position of an incident light. A reference voltage $V_{cc}$ is applied thereto and two output terminals A and B are provided. Initial stage amplifiers 17 and 18 of the same configuration are connected to the output terminals A and B. The initial stage amplifiers 17 and 18 have OP amplifiers 101 and 103, and feedback resistors 102 and 104, respectively, and a common reference voltage KVC is connected to non-inverting terminals of the OP amplifiers 101 and 103. The initial stage amplifiers 17 and 18 form current-voltage converters which convert a current produced at the output terminal of the photo-detector 3 to a voltage output. Numeral 19 denotes an inverter connected to the output terminal of the initial stage amplifier 17 through a DC blocking capacitor 105. The inverter 19 comprises an OP amplifier 109, a feedback resistor 107 and resistors 106 and 108. Numeral 20 denotes a variable amplification factor summing amplifier which comprises an OP amplifier 121 and externally connected resistors 112-116 and 120. The adding resistors 112 and 113 are connected to the output terminals of the initial stage amplifiers 17 and 18 through DC blocking capacitors 110 and 111, respectively. Shunt circuits are provided in the three resistors 114-116 in the feedback circuit of the OP amplifier 121 of the summing amplifier 20. The shunt circuits include known analog switches 117-119 such as MOSFET's, which are turned on by outputs SPL2A, SPL2B and SPL2C of NAND gates 232, 234 and 236 shown in FIG. 5. Resistances of the resistors 114-116 correspond to three predetermined distance zones and function to cancel the factor of square the of a distance from the current generated by the photo-detector 3 (which is proportional to the reflection coefficient of the object and proportional to the square of a distance to the object) by the distance. The summing amplifier 20 forms a portion of the range finder circuit 4 and also forms a portion of the reflected light level detection circuit 5, as will be described later.

Numeral 21 denotes a variable time constant integrator which comprises an OP amplifier 130, an externally connected capacitor 132 and four resistors 122, 124, 126 and 128 connected in parallel to an inverting input terminal of the OP amplifier 130. An input terminal of the integrator 21 is connected to the output terminal of the inverter 19 through the resistor 122 and also connected to the output terminal of the summing amplifier 20 through the resistors 124, 126 and 128. Analog switches 123, 125, 127 and 129 are arranged between the resistors 122, 124, 126 and 128 and the inverting input terminal of the OP amplifier 130. Those analog switches are separately turned on by an output SPL1 of an AND gate 212 and outputs 2PL2A, SPL2B and SPL2C of inverters 233, 235 and 237, respectively, shown in FIG. 5. By connecting one of those resistors to the OP amplifier 130, the time constant of the integrator 21 can be selected. Resistances of the resistors 124, 126 and 128 connected to the output terminals of the summing amplifier 20 corresponds to the predetermined three distance zones as the gain setting resistors 114-116 of the summing amplifier 20 do, and the resistors 114 and 124, the resistors 115 and 126, and the resistors 116 and 128 are paired and those pairs are separately switched in the circuit.

A shunt circuit is provided in the capacitor 132 of the integrator 21. The shunt circuit includes an analog switch 31 which is turned on by an output AFSHORT of a NAND gate 222 shown in FIG. 5. The analog switch 131 is used to reset the integrator 21.

Numeral 22 denotes a variable reference comparator which comprises an OP amplifier 133, resistors 134-136 connected to a non-inverting input terminal for setting a reference voltage and three analog switches 137-139 connected in parallel to the non-inverting input terminal of the OP amplifier 133. The resistors 134-136 are connected in series between the two reference voltages VC and KVC. For example, when only the analog switch 137 is turned on, a voltage produced by dividing the differential voltage between the reference voltages VC and KVC by a ratio of the resistor 134 and the resistors 135 and 136 is applied to the non-inverting input terminal of the OP amplifier. Thus, by turning on one of the analog switches 137 to 139, the reference voltage of the comparator 22 is selected.

The analog switches 137-139 are turned on by outputs RH, RM and RL of a latch and decoder 229 in the circuit of FIG. 5. The latch and decoder 229 functions as a control circuit to update the reference of the comparator 22. As will be explained later, the latch and decoder 229 is a portion of the object reflection coefficient calculation circuit 6, and the integrator 21 and the comparator 22 form the range finder circuit 4 and also form the reflected light level detection circuit 5 and the object reflection factor calculation circuit 6.

FIG. 4

In FIG. 4, numeral 7 denotes a first photo-detector to which a light from the main object is applied and numeral 9 denotes a second photo-detector to which a light from a sub-object (for example, background) other than the main object is applied. The photo-detectors comprise known SPD's (silicon photo-diodes). The photo-detectors 7 and 9 are connected to OP amplifiers 183 and 184, respectively, which form a portion of the light intensity measuring circuits 8 and 10 of FIG. 1. The light intensity measuring circuit 10 connected to the photo-detector 9 comprises an OP amplifier 183, a logarithmic compression diode 182, an expansion transistor 191, a capacitor 190, an analog switch 189, a variable voltage 192 and a comparator 193, and it detects a light flux from the sub-object (that is, a brightness of the sub-object).

On the other hand, the first light intensity measuring circuit 8 for detecting the brightness of the main object and the brightness difference calculation circuit 12 form a lower portion of the circuit of FIG. 4 and those circuits comprise an OP amplifier 184, a logarithmic compression diode 185, an expansion transistor 196, a capacitor 195, an analog switch 194 and a comparator 197. The first and second light intensity measuring circuits 8 and 10 also form a portion of the brightness difference calculation circuit 12 shown in FIG. 1. Since the inverting input terminal of the comparator 193 of the sub-object light intensity measuring circuit is connected to the inverting input terminal of the comparator 197, the brightness of the sub-object and the brightness of the main object are applied to the comparator 197 so that the comparator 197 produces an output signal corresponding to the brightness difference of the both objects.

FIG. 1 shows the main object brightness correction circuit 11 which relates to the first light intensity measuring circuit 8 and the reflection coefficient calculation circuit 6. The correction circuit 11 comprises analog switches 186-188 connected to the non-inverting input terminal of the OP amplifier 184 of FIG. 4, a latch and decoder 229 (FIG. 5) for controlling the analog switches 186-188, and power supplies V for applying three different input voltages to three parallel circuits connected to the analog switches 186-188. Those three input voltages are logarithmically compressed to $$\frac{3kT}{q} \ln 2, \frac{2kT}{q} \ln 2 \text{ and } \frac{kT}{q} \ln 2,$$

and the three input voltages have ratio of 3, 2 and 1.

FIG. 5

The circuit shown in FIG. 5 has a sequence control function to control the circuits shown in FIGS. 2 to 4, and comprises portions of the range finder circuit 4, reflection coefficient calculation circuit 6, reflected light level detection circuit 5 and object brightness correction circuit 11.

In FIG. 5, numerals 229 and 231 denote latch-and-decoders. The latch and decoder 229 forms portions of the reflection coefficient calculation circuit 6, and the latch and decoder 231 forms portions of the range finder circuit 4 and the memory circuit 13. A number of logic gates and RS flip-flops shown in FIG. 5 control the operation of the latch-and-decoders 229 and 231 and form a sequence controller for controlling analog switches shown in FIGS. 3 and 4. Numeral 205 denotes a binary counter which sequentially generates outputs $A_1, Q_2, \ldots, Q_h, \ldots, Q_z$ of different frequencies. It reshapes pulses of a constant frequency generated by an oscillator 198 to generate the outputs $Q_1, Q_2, \ldots$. The oscillator 198 comprises inverters 202 and 203, resistors 200 and 201 and a capacitor 204, and oscillates at a time constant determined by the capacitor 204 and the resistors 200 and 201.

A normally open contact which is linked to a release button of a camera is connected to a reset terminal R of each of the binary counter 205, R-S flip-flops 206, 207, 215, 216, 220, 223 and 224, and latch-and-decoders 223 and 224 when the release button is not depressed, an "H" level voltage is applied to the reset terminal R and the binary counter 205 and the RS flip-flops 206, 207, 215, 216, 220, 223 and 224 and the latch-and-decoders 229 and 231 are kept reset.

Besides, the latch-and-decoders 229 and 231, even after the reset signal to the reset terminal R has been released, maintain the initial state thereof until the latch signal is applied thereto. In the initial state, only an output RL of the latch-and-decoder 229 has been H level and an output to the NAND gate 232 of the latch-and-decoder 231 is H level. The latch-and-decoder 231 changes a decode output correspondingly to an input signal until the latch signal is inputted therein and maintains the decode output when the latch signal is inputted therein. On the other hand, the latch-and-decoder 229 maintain the initial state thereof until the latch signal is inputted and outputs a decode signal correspondingly to the input signal when the latch signal is inputted.

Referring to FIGS. 2 to 6, the operations of the circuits of FIGS. 2 to 5 are explained.

When the release button of the camera is not depressed, the voltage applied to the reset terminal R of the binary counter 205 is of "H" level (a reset signal is applied). Accordingly, the binary counter 205 produces no output and the RS flip-flops 206, 207, 215, 216, 220, 223 and 224 are reset so that the voltage at the Q terminal of each of the RS flip-flops is L level and the voltage at the $\bar{Q}$ terminal is H level. The latch-and-decoders 229 and 231 are also reset and no input is applied thereto.

When the release button of the camera is depressed, the voltage applied to the reset terminal R of each of the flip-flops 206, 206, 215, 216, 220, 223, and 224 changes to the L level and the voltage applied to the reset terminal R of the binary counter 205 changes to the L level, and the binary counter 205 starts its operation. The binary counter 205 reads in the output of the oscillator 198 to generate the timing signals $Q_1, Q_2, \ldots Q_h, \ldots Q_z$ of various periods. When the first timing signal $Q_1$ is generated, the RS flip-flop 206 is set by the rise of the signal $Q_1$ and the output level at the Q terminal changes to the H level. Thus, the voltage level at the output terminal of the NAND gate 209 changes to the L level and the output $\overline{\text{IRON}}$ is produced. (See FIG. 6). Accordingly, the output $\overline{\text{IRON}}$ of the NAND gate 209 repeatedly assumes the L level and the H level in accordance with the period of the timing signal $Q_1$.

Since the output $\overline{\text{IRON}}$ of the NAND gate 209 is applied to a base of the input stage transistor 155 of the light emission control circuit 2 of FIG. 2, through the resistor 156, the transistor 155 is driven in synchronism with the signal $\overline{\text{IRON}}$ and the OP amplifier 150 drives the output stage transistor 154 at the same period. As a result, the light emitting device 1 emits light at the period of the signal $\overline{\text{IRON}}$.

When the infrared ray emitted from the light emitting element 1 toward the object is reflected from the object, the reflected light is applied to the photo-detector 3 which produces currents at the terminals A and B in accordance with the intensity and position of the incident light. The current produced at the terminal A is converted to a voltage output by the initial stage amplifier 17, and a DC component (a photo-current produced by an external light component) is cut by the DC blocking capacitor 105 so that only a signal component which is proportional to the reflected light intensity and the incident light position is applied to the inverter 19.

Accordingly, the output of the inverter 19 is the voltage $V_A$ which corresponds to the current $I_A$ from the output terminal A of the photo-detector. On the other hand, the timing signal $Q_1$ is applied to the set terminal S of the flip-flop 206 and also to the inverter 208. Thus, the AND gate 212 opens at the fall of $Q_1$ to produce the signal SPL1. As a result, the output voltage $V_A$ of the inverting amplifier 19 is sampled in synchronism with the turn-on and turn-off of the analog switch 123 and it is applied to the integrator 21 which integrates the signal voltage $V_A$. Since the analog switch 131 is now off (open), that is, the input to the inverter 221 changes to the L level as the reset is released and the output AFSHORT of the NAND gate 222 changes to the L level, the input AFSHORT to the analog switch 131 changes to the L level and the analog switch 131 is turned off, the shunt circuit of the capacitor 132 is opened and the integrator 21 is ready for integration. Although the signal $Q_1$ is also applied to the latch and decoder 231 Q output of the flip-flop 211, at this time, still is at the L level so that the latch signal is not applied to the latch and decoder 231. Therefore, the latch-and-decoder 231 stays in the initial state so that the decode output is not provided. Since a H level signal is outputted only to NAND gate 232 from, as stated above, the latch-and-decoder 231, a signal has been applied to the other input terminal of NAND gate 232, the signal level at the output terminals of the NAND gates 232, 234 and 236 is at the H level. As a result, the signals $\overline{\text{SPL2A}-\text{SPL2C}}$ are at the L level and the signals SPL2A–SPL2C are at the H level. Accordingly, the analog switches 125, 127 and 129 of the integrator 21 are turned off and the summing amplifier 20 is in the off-state to the integrator 21. On the other hand, the analog switches 117–119 of the summing amplifier 20 are in the on-state and the resistors 114–116 are shorted.

Accordingly, only the output voltage $V_A$ of the inverter 19 is applied to the integrator and the capacitor 132 is charged so that a voltage AFINT at the output terminal of the integrator 21 linearly rises from generation of the timing signal $Q_1$ as shown in FIG. 6, that is, the rising integration is effected. A gradient of the voltage AFINT is proportional to the time constant determined by the resistor 122 and the capacitor 132, that is, it is constant.

A predetermined time $T_1$ (see FIG. 6) after the generation of the signal $Q_1$ (that is, the start of integration), the binary counter 205 produces the signal $Q_I$ so that the RS flip-flop 207 is set and the signal level of the output terminal Q changes to the H level and the signal level of the output terminal $\overline{Q}$ changes to L. Thus, the AND gate 212 is turned off and the signal SPL1 terminates. As a result, the analog switch 123 is opened and the connection between the inverter 19 and the integrator 21 is disconnected, and the rise of the output voltage AFINT of the integrator 21 stops. On the other hand, when the signal $Q_I$ is produced and the Q output of the R-S flip-flop 207 becomes H level, a signal in synchronism with the $Q_1$ output of the binary counter 205 is produced through the NAND gate 214 from the NAND gate 213. The latch signal has not been, at this time, applied to the latch and decoder 231, so that since the H level signal is applied to only the NAND gate 232, the NAND gate 232 produces, in response to an output of the NAND gate 214, H and L level signals in synchronism with the $Q_1$ output of the binary counter 205. As the result, the signal level of the output terminal of the NAND gate 232 changes to the L level so that the signals $\overline{SPL2A}$ and SPL2A are generated (see FIG. 6).

As the signals SPL2A and $\overline{SPL2A}$ are generated, the analog switch 117 arranged in parallel to the resistor 114 of the summing amplifier 20 is actuated and the analog switch 125 arranged in series with the resistor 124 of the integrator 21 is actuated. As a result, only the resistor 114 is connected in the feedback circuit of the OP amplifier 121 of the summing amplifier 20, and only the resistor 124 is connected at the input terminal of the integrator 21. Accordingly, the amplification at an amplification factor determined by the resistor 114 is effected in the summing amplifier 20, and the integration is effected in the integrator 21 at a time constant determined by the product of the resistance of the resistor 124 and the capacitance of the capacitor 132.

In the present embodiment, the resistance of the resistor 114 of the summing amplifier 20 and the resistance of the resistor 107 of the inverter 19 are equal, and the resistances of the resistors 122 and 124 of the integrator 21 are equal in order to facilitate the range finder calculation.

After the analog switch 123 has been opened and the connection between the inverter 19 and the integrator 21 has been disconnected, the output voltages of the initial stage amplifiers 17 and 18 are applied to the OP amplifier 121 of the summing amplifier 20 through the DC blocking capacitor 110 and 111 and the summing resistors 112 and 113, respectively, and amplified by an amplification factor determined by the resistors 112-114. The output of the summing amplifier 20 is a voltage $(V_A+V_B)$ which is proportional to the sum of the output currents at the output terminals A and B of the photo-detector 3. Since the resistance of the resistor 114 is equal to the resistance of the resistor 117 of the inverter 19, the output $(V_A+V_B)$ of the summing amplifier 20 is amplified at the same gain as the output $V_A$ of the inverter 19 is amplified.

At the time of the generation of the signal $Q_I$, the integrator 21 of the summing amplifier 20 is connected and the output voltage $(V_A+V_B)$ of the summing amplifier 20 is applied to the integrator 21. Thus, the output voltage AFINT of the integrator 21 starts to fall as shown in FIG. 6 and falling integration is started. The time constant of the integration is determined by the resistance of the resistor 124 and the capacitance of the capacitor 132. Since the resistance of the resistor 124 is equal to the resistance of the resistor 122, the time constant in the falling integration is equal to the time constant in the rising integration.

On the other hand, the latch and decoder 229 which has the function of updating the reference is now in the initial state because the Q output of the R-S flip-flop 216 is L level so that no output is provided from the AND gates 227 and 228, and only the output $R_L$, as stated above, is at the H level. As a result, only the analog switch 139 of the comparator 22 is in the onstate and the reference voltage KVC is applied to the non-inverting terminal of the OP amplifier 133 through the analog switch 139.

As the output AFINT of the integrator 21 gradually falls and reaches the reference voltage KVC (see FIG. 6), the voltage level at the output terminal of the comparator 22 changes to the H level and the comparator 22 produces an output. As the comparator 22 produces the output, the OR gate 210 produces an output as shown in FIG. 5 and the RS flip-flop 211 is set. As a result, the output level at the Q terminal changes to the H level, and a latch signal (strobe signal) is applied to the latch and decoder 231 to latch the signal $Q_1$ -$Q_I$ which has been applied to the latch and decoder 231. As a result, a time $t_1$ (see FIG. 6) during which down integration is completed on the basis of the states of signals $Q_1$ -$Q_I$ is stored in the latch and decoder 231. The time $t_1$ is represented by a product $$\frac{V_A}{V_A + V_B} \cdot T_1$$

of the time $T_1$ (known) required for the rising integration and an output voltage ratio $$\frac{V_A}{V_A + V_B}$$

of the inverter 19 and the summing amplifier 20.

A relationship of $$t_1 = \frac{V_A}{V_A + V_B} \cdot T_1 = \frac{L - x}{L} \cdot T_1$$

is met, where L is a distance between the output terminals A and B of the photo-detector 3 and x is a distance between the position of the incident reflected light to the photo-detector 3 and the terminal A. Accordingly, when the $t_1$ is determined, it means that the position of the incident reflected light (that is, the distance to the object or the incident angle of the reflected light to the photo-detector) is determined. Thus, the distance to the object or the distance information is obtained by measuring $t_1$.

Besides when the output AFCOMP of the comparator 22 is generated so that the RS-flip-flop 211 is set, and the Q output becomes the H level, the output of the NAND gate 217 becomes the L level so that the signal AFSHORT is outputted from the NAND gate 222 and the analog switch of the integrator 21 is turned on, and as the result, the electric charge integrated in the condenser 131 is discharged so that the integrator 21 is reset.

As the distance has been measured in the above manner, the latch and decoder 231 selects the circuit constant necessary to calculate the reflection coefficient in accordance with the distance $t_1$. Namely, when the distance $t_1$ is obtained, the latch and decoder 231 selectively applies the output signal to the input terminals of the NAND gates 232, 234 and 236 so that the NAND gates 232, 234 and 236 are singly or jointly opened in accordance with the distance $t_1$. In the present embodiment, it is assumed that the input signal is applied to the NAND gate 234 from the latch and decoder 231.

After the input signal has been applied to the NAND gate 234 from the latch and decoder 231, the $Q_n$ output is generated by the binary counter 205. Thus, the RS flip-flop 215 is set at the rise of the $Q_n$ output and the Q terminal of the RS flip-flop assumes the H level and the $\overline{Q}$ output terminal assumes the L level. As a result, the output level of the NAND gate 218 repeatedly provide the H and L levels in synchronism with the $Q_1$ output of the binary counter 205 provided through the invertor 238, and the output of the NAND gate 214 assumes the L level and the output of the NAND gate 234 assumes the L level, and the signals SPL2B and $\overline{SPL2B}$ are generated. Since there is no input from the latch and decoder 231 to the NAND gates 232 and 236, the output levels of the NAND gates 232 and 236 are H and the signals $\overline{SPL2A}$ and $\overline{SPL2C}$ are not generated.

When the signal SPL2B and $\overline{SPL2B}$ are generated, the analog switch 118 of the summing amplifier 20 is opened and the analog switch 127 of the integrator 21 is also opened. As a result, only the resistor 115 is connected to the feedback path of the OP amplifier 121 in the summing amplifier, and only the resistor 126 is connected to the input terminal of the OP amplifier 130 in the integrator 21. Accordingly, in the summing amplifier 20, the input voltage is amplified at an amplification factor determined by the resistance of the resistor 115, and in the integrator 21, the integration is effected at the time constant determined by the resistance of the resistor 126 and the capacitance of the capacitor 132.

On the other hand, when the RS flip-flop 215 is set by the generation of the signal $Q_n$, the $\overline{Q}$ output of the RS flip-flop 215 assumes the L level, the output of the NAND gate 217 assumes the H level, the output of the NAND gate 222 assumes the L level, the analog switch 131 is opened. As the result the integrator 21 starts the integration operation according to an input signal.

Since the analog switch 123 is now in the open state, only the output $m(V_A + V_B)$ (where m is the amplification factor) of the summing amplifier 20 is applied to the integrator 21 through the resistor 126. In the integrator 21, as stated above, the integration is effected at a time constant determined by the resistor 126 and the capacitor 132.

After a predetermined time $T_2$ from the generation of the signal $Q_n$ (that is, the start of the second rising integration (see FIG. 6)), the binary counter 205 generates the next signal $Q_0$ and the RS flip-flop 216 is set by the rise of the signal $Q_0$. As a result, the output $\overline{Q}$ of the RS flip-flop 216 assumes the L level, the output of the NAND gate 218 assumes the H level, the output level of the NAND gate 214 assumes the L level, the output of the NAND gate 234 assumes the H level, and the signals $\overline{SPL2B}$ and SPL2B terminate (see FIG. 6). Accordingly, the analog switch 127 of the integrator 21 is opened and the connection between the summing amplifier 20 and the integrator 21 is disconnected. Thus, the input voltage to the integrator 21 terminates and the rise of the output voltage AFINT of the integrator 21 stops. Thus, the rising integration ends (see FIG. 6). On the other hand, since the RS flip-flop 216 is set by the $Q_0$ output of the binary counter 205, the Q output of the RS flip-flop 216 assumes the H level and the input is applied to the two AND gates 227 and 228 associated with the latch and decoder 229. Since the two outputs $Q_1$ and $Q_2$ of the binary counter 205 are applied to the AND gate 227 and 228 as shown in FIG. 5, the AND gate 227 applies the input signal to the latch and decoder 229 at the period of the signal $Q_1$ and the AND gate 228 applies the input signal to the latch and decoder 229 at the period of the signal $Q_2$. The latch and decoder 229 decodes the signals applied from the AND gates 227 and 228 and sequentially generates the RM output, the RH output and the RL output. If the output of the latch and decoder 229 is RH, the analog switch 137 connected to the non-inverting terminal of the OP amplifier 133 of the comparator 21 is turned on and the voltage DC is connected to the non-inverting terminal through the resistor 134 and the other voltage KVC is connected through the resistors 135 and 136. Accordingly, the voltage applied to the non-inverting terminal of the OP amplifier 133 is represented by $$\frac{(R_2 + R_3) \cdot VC - R_1 \cdot KVC}{R_1 + R_2 + R_3}.$$

where $R_1$ is the resistance of the resistor 134, $R_2$ is the resistance of the resistor 135, and $R_3$ is the resistance of the resistor 136. When the output of the latch and decoder 229 is RM, the analog switch 138 is turned on and the voltage applied to the non-inverting terminal of the OP amplifier 133 is represented by $$\frac{(R_1 + R_2) \cdot KVC - R_3 \cdot VC}{R_1 + R_2 + R_3}.$$

Namely, when the output of the latch and decoder 229 is switched by the inputs $Q_1$ and $Q_2$, the reference of the comparator 22 is changed. Accordingly, the input voltage AFINT from the integrator 21 to the comparator 22 is sequentially compared with those reference voltages. If the integrator output AFINT is equal to the reference voltage, the output of the comparator 22 is H level and generates the comparator output AFCOMP (see FIG. 6). When AFCOMP is produced, it is applied to the OR gate 210, NAND gate 219 and AND gate 230 of the circuit shown in FIG. 5. As a result, the output level of the AND gate 219 assumes the H level, the $\overline{Q}$ output of the RS flip-flop 220 assumes the L level, the output level of the NAND gate 222 assumes the H level, the output AFSHORT assumes the H level, and the analog switch 131 is closed. As a result, the capacitor 132 of the integrator 21 is shorted and the output voltage AFINT of the integrator 21 instantly falls to the reference voltage KVC as shown in FIG. 6.

On the other hand, the AND gate 230 also produces the output and the latch signal is applied to the latch and decoder 229. The latch and decoder 229 latches the input corresponding to the current output RH, RM or RL. As a result, the latch and decoder 229 latches one of the outputs RH, RM and RL produced when AFCOMP is generated and stores a time $t_2$ on the basis of the states of the signals $Q_1$ and $Q_2$ (see FIG. 6) from the time of input from the AND gates 227 and 228 to the time of application of the latch signal. The time $t_2$ is proportional to the reflection coefficient of the object. Accordingly, the reflection coefficient of the object is determined by measuring the time $t_2$.

As described in the preceding Related Background Art section, the light flux incident into the photo-detector 3 is in proportion to the product of (the intensity of the incident light flux to the target object), (the reflection coefficient of the target object) and (the distance to the target object)$^{-2}$. Therefore, applying the above principle to a signal light and assuming that all of the infrared ray emitted as a signal light from the light emitting element 1 is gathered on the target object by a projecting lens, the factors of (the intensity of the incident light flux to the target object) is a constant and is known, and the cancellation the factor of (the distance to the target object)$^{-2}$ from the intensity of the light flux incident to the photodetector 3 is performed by changing the gain of the adder amplifier 20 and the time-constant of the integrator 21 on the basis of the measured distance to the target object. Accordingly, the value obtained by the cancellation of the above factor from the intensity of the light flux incident to the photo-detector 3 and introduction of the known value into the above equation is in proportion to (the reflection coefficient of the target object) and corresponds to the time period $t_1$. Accordingly the reflection coefficient of the target object is determined. For example, assuming that the result of the previous measured distance to the target object is divided into 1 meter, 2 meters and 3 meters so that the resistance of the resistors 112, 113, 114, 124, 126 and 128 are respectively set R, 2R, 3R, 1/R, 1/2R and 1/3R, and that the latch-and decoder 231 is set so as to output SPL2A when the measured distance is 1 meter, SPL2B when the measured distance is 2 meters, and SPL2C when the measured distance is 3 meters, and the sampling duty the analog switch is 50%, the integration level AFINT obtained after the elapse of time period $T_2$ are respectively as follows;

when the measured distance is 1 meter, $AFINT=KVC+(1R/R)\times(P_0)\times(r/1^2)\times(1R/C)\times(T_2/2)$ when the measured distance is 2 meters, $AFINT=KVC+(2R/R)\times(P_0)\times(r/2^2)\times(2R/C)\times(-T_2/2)$ and
when the measured distance is 1 meter, $AFINT=KVC+(3R/R)\times(P_0)\times(r/3^2)\times(3R/C)\times(-T_2/2)$ And the above value of AFINT becomes equal to $KVC+(P_0)\times(r)\times(R/C)\times(T_2/2)$ when the factor of (the distance to the target object)$^{-2}$ is cancelled from the above values of AFINT, wherein $P_0$ is the incident power to the target object and r is the reflection coefficient of the object. Thus, $P_0$ is the intensity of the infrared ray projected from a camera to the target object so that the intensity is previously set at a predetermined level. Therefore the integration level AFINT is increased from the value of KVC by the level proportional to the reflection coefficient of the object. So, the reflection coefficient of the object may be obtained by comparing this level with a reference voltages set by sequentially changing-over the analog switches 137, 138 and 139 by the operational amplifier 133, to measure RL, RM and RH when the output of the AFCOMP becomes the H level. That is to say, when the AFCOMP becomes the H level during RL is the H level, the reflection coefficient of the object is low level, when the AFCOMP becomes the H level during RM is the H level, the reflection coefficient of the object is middle level, and when the AFCOMP becomes the H level during RH is the H level, the reflection coefficient of the object is high level. Besides, the above arrangement should be structured such that the value of $P_0$ is not varied in accordance with the ambient influence such as temperature, etc.

At the time of generation of the signal $Q_0$ (that is, at the time of end of the second rising integration), the RS flip-flop 216 is set and the $\overline{Q}$ output assumes the L level. Thus, the output $\overline{IRON}$ of the AND gate 209 terminates (see FIG. 6) and the light emission of the light emitting element 1 is stopped.

On the other hand, the distance and the reflection factor are measured by the circuit of FIG. 3, and the following operation is performed by the circuit of FIG. 4.

After the measurement of the reflection factor, the output of the latch and decoder 229 is held at RL, for example. The output RL causes the analog switch 188 of FIG. 4 to be turned on (closed) to connect the power supply $$\frac{3kT}{q} \cdot \ln 2$$

the non-inverting terminal of the OP amplifier 184. (In the circuit of FIG. 4, the analog switches 189 and 194 are closed before the circuit starts the operation and the plates of the capacitors 190 and 195 are shorted. The analog switches 186–188 are open when the inputs RH, RM and RL from the latch and decoder 229 are not present.)

When the reflected light (visible light) of the sub-object is applied to the photo-detector and the reflected light (visible light) from the main object is applied to the photo-detector 7, the terminal voltages of the photo-detectors change with the incident light intensities. Since the non-inverting terminal of the OP amplifier 183 is grounded, the output voltage of the photo-detector 9 is amplified as it is and also logarithmically compressed by the logarithmic compression diode 182 and it is applied to a base of the expansion transistor 191. Since the voltage $$\frac{3kT}{q} \cdot \ln 2$$

(where k is a Voltzman's constant, T is an absolute temperature and q is a charge of electrons) is applied to the non-inverting terminal of the other OP amplifier 184, the output of the OP amplifier 184 is equal to the voltage $$\frac{3kT}{q} \cdot \ln 2$$

plus the voltage obtained by logarithmically compressing the output current of the photo-detector 7 by the logarithmic compression diode 185. Namely, the reflected light from the main object (the brightness of the main object) is corrected by the reflection coefficient.

As the output voltages of the OP amplifiers 183 and 184 are applied to the bases of the transistors 191 and 196, the transistors 191 and 196 conduct and the capacitors 190 and 195 are charged by the collector currents.

After the reflection coefficient was measured by the circuits of FIGS. 3 and 5, the binary counter 205 generates the signal $Q_x$ and the RS flip-flop 223 is set. Thus, the output level of the NAND gate 225 assumes the L level and the outputs $AESHORT_1$ and $AESHORT_2$ assume the L level. As a result, the analog switches 189 and 194 shown in FIG. 4 are opened and the short circuits for the capacitors 190 and 195 are opened. Accordingly, the charging of the capacitors 190 and 195 starts at this moment. The variable reference voltage 192 connected to the non-inverting input terminal of the comparator 193 functions to change the reference of the brightness of the sub-object.

In the comparator 193, when the reference voltage set by the variable reference voltage 192 and the collector voltage of the transistor 191 (the voltage at the negative terminal of the capacitor 190) are equal, the output AECOMP1 is produced so that the brightness of the sub-object is measured. (The time period between the start of charging of the capacitor 190 and the generation of the output from the comparator 193 is measured by a counter or latch and decoder provided in the shutter control circuit 15 (not shown)).

Since the collector voltage of the transistor 191 and the collector voltage of the transistor 196 are applied to the comparator 197 as shown, if the charge level of the capacitor 190 is higher than the charge level of the capacitor 195 when the capacitors are charged, the output voltage level of the comparator 197 is at the H level and the output AECOMP2 is produced. This represents that the brightness of the sub-object (mean brightness) is higher than the brightness of the main object (center brightness), so that it is discriminated that the object is in the counter-light scene.

In the above case, either of the voltages of 3KT/q ln 2, 2KT/q ln 2, and KT/q ln 2 is added to the output of the light intensity measuring element 7 in accordance with the obtained reflection coefficient of the main object. As the result, the light intensity of the main object to be compared is shifted by KT/1 ln 2 in comparison with the value of the actual measured light intensity of the main object. Therefore, in any case, the measured light intensity which is 1 to 3 steps higher than the actual measured light intensity is compared with the measured light intensity of the sub-object. Accordingly, the fact that the output of the comparator 197 becomes the H level indicates that the measured light intensity of the main object is 1 to 3 steps lower than that of the sub-object. As the result, the fact that the main object is in the counter-light scene is discriminated. The lower the obtained section coefficient of the main object is, the higher the steps to be shifted is, and therefore, the detection of that the main object is in the counter light scene tends to be difficult. Therefore, in case the main object is not seen to be dark by the counter scene, but has the low reflection coefficient such as black, the error detection that the main object is in the counter light scene is prevented.

Accordingly, in case that it is detected the reflection coefficient of the main object is low level, as described above, 3KT/q ln 2 is selected so that the measured light intensity of the main object is shifted by the highest step.

As the comparator 197 produces the output AECOMP2, it is applied to the data terminal of the D flip-flop 226 as shown in FIG. 5. Thus, when the binary counter 205 produces the output $Q_y$, it is applied to the clock terminal of the D flip-flop 226 and an output according to AECOMP2 appears at the Q terminal of the D flip-flop 226. It is applied to the display circuit 14 in FIG. 1 or control circuit 15 for a camera shutter drive system, and a stroboscope circuit 16 (If the level of the Q output of the D flip-flop 226 is L, the object status is the forward light scene, and if the level of the Q output of the D flip-flop 226 is H, the object status is the counter-light scene. Accordingly, the shutter speed is, if the counter-light scene is determined, shifted to a long time period and whether the stroboscope is to be operated is determined depending on whether the status is the forward light scene or the counter-light scene.)

When the signal $Q_z$ is generated from the binary counter 205, the output level of the NAND gate 225 assumes the H level through the $\overline{Q}$ terminal of the RS flip-flop 224, and the outputs ($AESHORT_1$ and $AESHORT_2$) of the NAND gate 225 assume H, the analog switches 189 and 194 of FIG. 4 are closed, and the comparators 193 and 197 are reset.

In accordance with the device of the present invention, whether the object status or monitored status is forward light scene or counter-light scene can be automatically determined. In the above embodiment, a number of resistors are provided in the summing amplifier 20 and the integrator 21 for calculating the reflection coefficient (more specifically, correcting the output of the photo-detector by the distance) to correct in the analog manner. Instead of the arrangement shown in FIG. 3, an arrangement shown in FIG. 7 may be used to digitally calculate the reflection coefficient.

Figure 7:
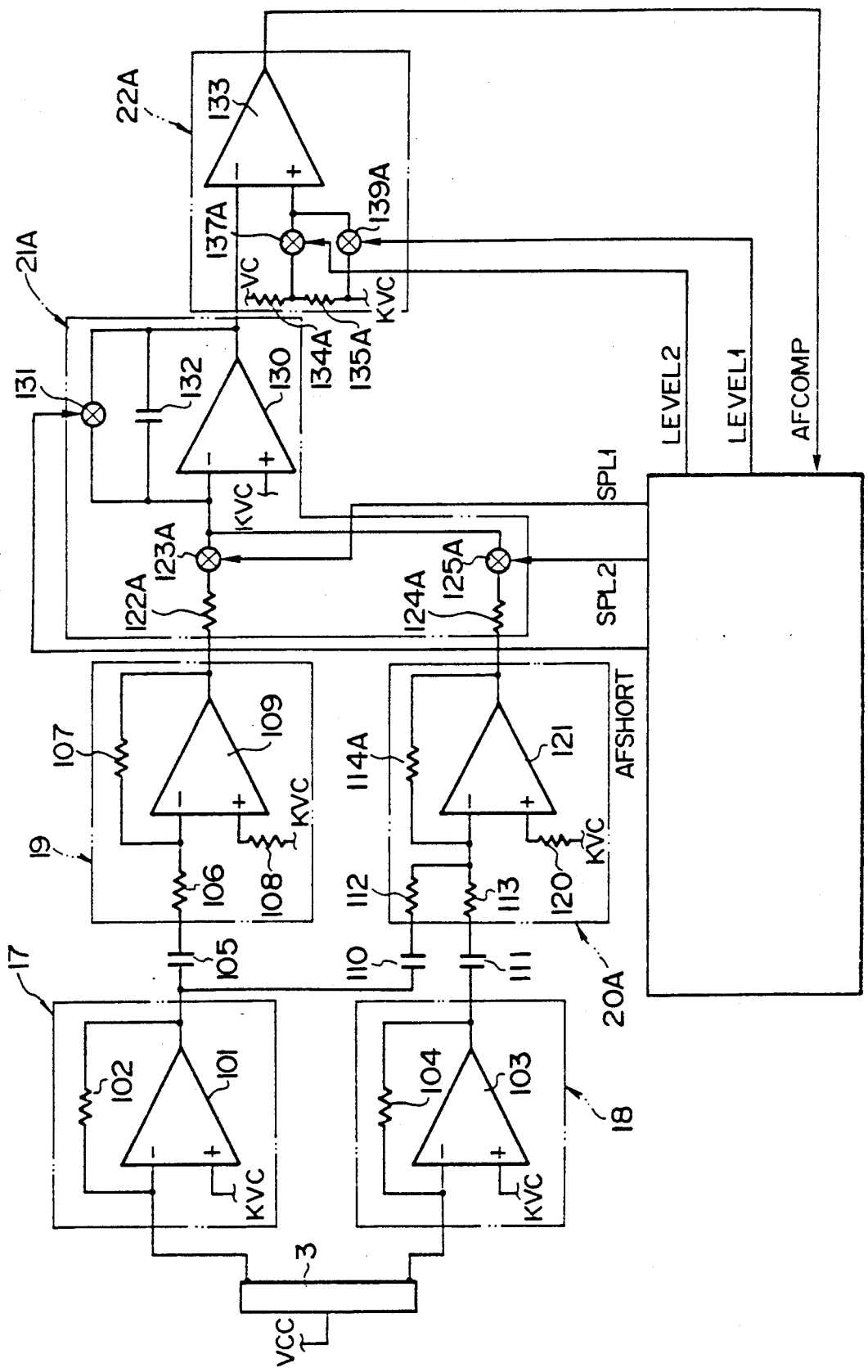
FIG. 7 shows a modification of the embodiments shown in FIGS. 3 to 7.

FIG. 7 shows another embodiment of the present invention. The like elements to those shown in FIG. 3 are designated by the like numerals. A suffix A means that a portion of the circuit shown in FIG. 3 has been modified. In the embodiment of FIG. 7, the number of resistors and analog switches in the circuits of the summing amplifiers 20A, integrator 21A and comparator 22A is significantly smaller than that of the embodiment of FIG. 3. A logic controller 300 is designed such that the reflection coefficient is carried out by a digital reflection coefficient calculation circuit in a logic controller 300 to simplify the analog circuit.

In FIG. 7, numeral 114A denotes a single feedback resistor arranged in the OP amplifier 121 of the summing amplifier 20A, numerals 123A and 125A denote analog switches arranged in parallel to the input terminal of the integrator 21A, numerals 134A and 135A denote reference changing resistors connected to the OP amplifier 133 of the comparator 22A, and numerals 137A and 139A denote analog switches.

In the embodiment shown in FIG. 7, the circuit operates as follows. Similar to the embodiment of FIG. 3, after the distance to the object has been measured as the light emitting element starts the light emission, the logic controller 300 produces the output SPL2 and the analog switch 125A is turned on and off at the period of the signal SPL2 and the output voltage ($V_A + V_B$) of the inverter 19 is applied to the integrator 21A. The signal LEVEL1 applied to the analog switch 139A of the comparator 22A is now at the L level and the signal LEVEL2 applied to the analog switch 137A is at the H level. Thus, the analog switch 137A is turned on (closed) and the reference voltage of the comparator 22A is equal to the sum of the reference voltage VC and KVC divided by the resistors 134A and 135A. As the signal SPL1 is generated, the counter in the logic controller 300 starts to count and the integrator 21A starts the rising integration for the input voltage $V_A$. In the course of the rising integration, if the output of the integrator 21A exceeds the reference voltage, the output of the comparator is inverted so that the output signal AFCOMP assumes the L level. As a result, the counter in the logic controller 300 is stopped and the time interval from the start of the rising integration to the end of counting is outputted as the reflected light level.

Because the value of the reflected light level is a function of the distance to the object and the reflection coefficient of the object and therefore when the distance to the object is measured by the conventional method, and the reflected light level is digital, it is applied to the digital reflection coefficient calculation circuit in the logic controller 300 to calculate the reflection coefficient by cancelling the above described factor of the distance to the object.

In the embodiment of FIG. 7, the digital reflection coefficient calculation circuit is provided in the logic controller 300 so that the analog circuit configuration shown in FIG. 3 is simplified and calculation precision is improved. The method for calculating the reflection coefficient in the embodiment of FIG. 7 is explained with reference to FIG. 6. In the circuit shown in FIG. 3, the second rising integration necessary for calculating the reflection coefficient is carried out until the predetermined time $T_2$ has elapsed. In the embodiment of FIG. 7, the time of the second rising integration is not constant but the reflection coefficient is calculated by detecting a time at which the final output voltage $AFINF_{(max)}$ is reached in the rising integration.

In the above embodiments, the present device is applied only to an active range finder system, although it may be applied to a passive range finder system with an auxiliary illumination.

In the present embodiment, the level information of the active type range finder system is used to measure the reflection coefficient of the object. Alternatively, the reflection coefficient of the object may be an calculated by other method, for example, by placing a reference reflection plate having a predetermined reflection coefficient in a vicinity of the object and comparing the brightness of the reflection plate and the brightness of the object.

In the above embodiments, the present device is applied to the camera. The present device may also be applied to an unattended monitoring recorder or robot.

As explained above in connection with the embodiments, when the present status discriminator is mounted on the camera, the photographing status can be correctly and automatically discriminated, which has not been able in the prior art automatic cameras. As a result, the operability and performance of the camera are materially improved. Since the present device can be constructed by utilizing portions of the automatic exposure control device and the automatic focus device, the size and weight of the camera will not increase even if the present device is mounted on the camera.

What we claim is:

1. An automatic status discriminator comprising:
   distance measuring means for calculating the distance to a target object to provide a signal corresponding to the distance;
   reflection coefficient calculation means for calculating the reflection coefficient of the target object on the basis of the signal provided from said distance measuring means;
   light intensity measuring means for providing signals respectively corresponding to the brightness of the target object and the brightness of a region near the target object;
   adjusting means for adjusting the signal corresponding to the brightness of said target object on the basis of the reflection coefficient obtained from said reflection coefficient calculation means to provide the adjusted signal; and
   status discriminating means for comparing the signal corresponding to the brightness of the region near said target object with the output from said adjusting means to thereby discriminate the status of said target object.

2. A discriminator according to claim 1, wherein said distance measuring means comprises means for providing an electric signal corresponding to the distance to the target object and means for calculating the distance to the target object on the basis of said electric signal.

3. A discriminator according to claim 1, wherein said light intensity measuring means comprises a first light intensity measuring element for providing an electric signal corresponding to the brightness of said target object;
   a second light intensity measuring element for providing an electric signal corresponding to the brightness of the region near said target object;
   a first light intensity measuring circuit for calculating the brightness of said target object on the basis of said electrical signal from said first light intensity measuring element; and a second light intensity measuring circuit for calculating the brightness of the region near the target object on the basis of said electric signal from said second light intensity element.

4. A camera system having an apparatus according to claim 1, wherein said status discriminating means discriminates whether the target object is in the forward light scene or in the back lit light scene.

5. A camera system having an apparatus according to claim 2, wherein said status discriminating means discriminates whether the target object is in the forward light scene or in the back lit light scene.

6. A camera system having an apparatus according to claim 3, wherein said status discriminating means discriminates whether the target object is in the forward light scene or in the back lit light scene.

7. An automatic status discriminator comprising:
   a distance detection element for generating an electrical output representing a distance to a target object;
   a distance measuring circuit for calculating the distance to the target object based on the output of said distance detection element;
   a reflection coefficient calculation circuit for calculating a reflection coefficient of the target object from the output of said distance detection element in accordance with the output of said distance measuring circuit;

a first photo-detector for generating an electrical output representing a brightness of the target object;

a second photo-detector for generating an electrical output representing a brightness of a surrounding region of the target object;

a first light intensity measuring circuit for calculating the brightness of the target object based on the output of said first photo-detector;

a second light intensity measuring circuit for calculating a brightness of the surrounding region based on the output of said second photo-detector;

a correction circuit for correcting the output of said first light intensity measuring circuit by the reflection coefficient; and a comparator for comparing the output of said second light intensity measuring circuit with the output of said correction circuit.

8. A camera system having an apparatus according to claim 7, wherein said status discriminating means discriminates whether the target object is in the forward light scene or in the back lit light scene.

9. An automatic exposure control apparatus having an automatic status discriminator, said discriminator comprising:

distance measuring means for calculating the distance to a target object to provide a signal corresponding to the distance;

reflection coefficient calculation means for calculating the reflection coefficient of the target object on the basis of the signal provided from said distance measuring means;

light intensity measuring means for providing signals respectively corresponding to the brightness of the target object and the brightness of a region near the target object;

adjusting means for adjusting the signal corresponding to the brightness of said target object on the basis of the reflection coefficient obtained from said reflection coefficient calculation means to provide an adjusted signal;

status discriminating means for comparing the signal corresponding to the brightness of the region near said target object with the adjusted signal to thereby discriminate the status of said target object; and said control apparatus further comprising means for automatically controlling the exposure on the basis of the output from said discriminating means.

10. An automatic status discriminator comprising:
(a) a distance measuring means for measuring the distance to a target object by projecting a signal light to the target object, receiving a light reflected by said target object, and determining distance to the target object;
(b) a level detection means for utilizing the light reflected by the target object and determining the level of the light reflected by the target object; and
(c) a calculation means for calculating a reflection coefficient of the target object on the basis of the output of said distance measuring means and said level detection means.

11. A discriminator according to claim 10, further comprising a judging means for judging the status of the target object in response to the output of said calculation means.

12. A discriminator according to claim 11, wherein said judging means has a determination means for determining in response to the output of the said calculation means whether the target object has a black color or is in a dark situation.

13. A discriminator according to claim 12, wherein said judging means comprises a means for detecting whether the target object is in a back lit state or in a normal light state.

14. A discriminator according to claim 11, wherein said judging means further comprises a first photometering means for measuring the brightness of the target object and a determination means for determining whether the target object has a black color or is in a dark situation.

15. A camera having a device defined by claim 14, wherein said judging means comprises a second photometering means for measuring the brightness of the peripheral area of the target object, and a means for determining whether the target object is in a back lit state or in a normal light state on the basis of the signal from said second photometering means and said determining means.

16. A camera having an automatic status discriminator comprising:
(a) detection means for detecting a reflection coefficient of an object;
(b) photometry means for photometering the object;
(c) correction means for correcting an output of said photometry means on the basis of an output of said detection means;
(d) discrimination means for automatically discriminating a status of the object on the basis of an output of said correction means; and
(e) means for controlling a flash device in response to the output of said discrimination means.

17. An automatic status discriminator comprising:
(a) detection means for detecting a reflection coefficient of an object;
(b) photometry means for photometering the object;
(c) correction means for correcting an output of said photometry means on the basis of an output of said detection means; and
(d) discrimination means for automatically discriminating a status of the object on the basis of an output of said correction means.

18. An automatic status discriminator according to claim 17, wherein said discrimination means comprises a comparing means for comparing a photometering value for a region different from the object with the output of said correction means.

19. An automatic status discriminator according to claim 18, wherein said discrimination means comprises a determination means for determining that the object is in a backlit situation when said comparing means detects that a difference between an output of said correction means and the photometering value for the region different from the object is large.

20. An automatic status discriminator according to claim 17, wherein said detection means comprises a distance measuring means for measuring a distance to the object.

21. An automatic status discriminator according to claim 17, wherein said detection means comprises a calculation means for calculating the reflection coefficient on the basis of a distance to the object.

22. An automatic status discriminator according to claim 17, wherein said detection means comprises a signal projection means for projecting a light flux to the object and receiving a reflected light from the object.

23. An automatic status discriminator according to claim 22, wherein said detection means comprises a distance measuring means for measuring a distance to the object.

24. An automatic status discriminator according to claim 22, further comprising a means for measuring a distance to the object on the basis of an output of said signal projection means.

25. An automatic status discriminator according to claim 17, wherein said detection means comprises a calculation means for projecting a light flux to the object and for calculating the reflection coefficient on the basis of an intensity level of received light flux reflected by the object.

26. An automatic status discriminator according to claim 17, wherein said detection means further comprises a calculation means for calculating the reflection coefficient on the basis of the distance to the object and an intensity level of a light flux reflected by the object.

27. An automatic status discriminator according to claim 17, further comprising a means for controlling a flash device in response to an output of said discrimination means.

28. A camera having an automatic status discriminator comprising:
  (a) detection means for detecting a reflection coefficient of an object;
  (b) photometry means for photometering the object;
  (c) correction means for correcting an output of said photometry means on the basis of an output of said detection means;
  (d) discrimination means for automatically discriminating a status of the object on the basis of an output of said correction means; and
  (e) exposure control means for controlling an exposure operation in response to an output of said discrimination means.

29. A camera according to claim 28, wherein said discrimination means comprises a comparing means for determining a backlit situation by comparing a photometering value for a region different from the object with the output of said correction means.

30. A camera according to claim 28, wherein said exposure control means comprises a means for controlling a flash device in response to an output of said discrimination means.

31. A camera having an automatic status discriminator comprising:
  (a) detection means for detection a reflection coefficient of an object;
  (b) photometry means for photometering the object;
  (c) a correction means for correcting an output of said photometry means on the basis of an output of said detection means; and
  (d) discrimination means for automatically discriminating a status of the object on the basis of an output of said correction means,
  wherein said discrimination means comprises means for judging a backlit situation by comparing a photometering value for a region different from the object with the output of said correction means.

* * * * *

UNITED STATES PATENT AND TRADEMARK OFFICE
CERTIFICATE OF CORRECTION

PATENT NO. : 5,023,647
DATED : June 11, 1991
INVENTOR(S) : Noriaki SHIOMI, et al.

It is certified that error appears in the above-identified patent and that said Letters Patent is hereby corrected as shown below:

COLUMN 1:

Line 7, delete "a continuation of Ser. No. 191,752, which is"; and

Line 21, change "back lit" to --back lit,--; and

Line 54, delete "of".

COLUMN 2:

Line 20, change "to far-distance photographing" to --a far-distance object--;

Line 24, delete "all over";

Line 26, change "affect" to --effect--;

Line 27, delete (first occurrence) "of"; and
change "increases" to --becomes greater--; and Line 39, change "a" to --the--.

COLUMN 3:

Line 22, change "3 to 7" to --2 to 5--; and

Line 66, change "subob" to --sub-ob--.

UNITED STATES PATENT AND TRADEMARK OFFICE
CERTIFICATE OF CORRECTION

PATENT NO. : 5,023,647
DATED : June 11, 1991
INVENTOR(S) : Noriaki SHIOMI, et al.

It is certified that error appears in the above-identified patent and that said Letters Patent is hereby corrected as shown below:

COLUMN 4:

Line 4, change "counter light" to --counter-light--;

Line 23, change "elements 1" to --element 1--;

Line 25, change "photo detector" to -- photo-detector--;

Line 29, change "photo-detectors" to --light intensity detectors--;

Line 53, change "transistor 55" to --transistor 155--;

Line 54, change "amplifier 50" to --amplifier 150--; and

Line 55, "FIG 3" should be centered in the column.

COLUMN 5:

Line 20, change "square the" to -- the square--;

Line 47, change "corresponds" to --correspond--; and

Line 55, change "switch 31" to --switch 131--.

COLUMN 6:

Line 51, delete (second occurrence) --the--; and

Line 68, change "ratio" to --ratios--.

COLUMN 7:

Line 9, change "latch-and-" to --latch and--;

UNITED STATES PATENT AND TRADEMARK OFFICE
CERTIFICATE OF CORRECTION

PATENT NO. : 5,023,647
DATED : June 11, 1991
INVENTOR(S) : Noriaki SHIOMI, et al.

It is certified that error appears in the above-identified patent and that said Letters Patent is hereby corrected as shown below:

Line 15, change "latch-and-decoders" to --latch and decoders--;

Line 19, change "$A_1$" to --$Q_1$--;

Line 29, change "latch-and-decoders 223" to --latch and decoders 229--;

Line 30, change "224 when" to --231. When--;

Line 33, change "latch-and-decoders" to --latch and decoders--;

Line 35, change "latch-and-decoders" to --latch and decoders--;

Line 39, change "latch-and-decoders" to --latch and decoders--, and change "H" to --at the H--;

Line 40, change "latch-" to --latch--;

Line 41, change "and-decoder" to --and decoder--, and change "H" to --at the H--, and change "latch-and-decoder" to --latch and decoders--;

Line 45, change "latch-and-decoder" to --latch and decoders--;

Line 46, change "maintain" to --maintains--;

Line 53, change "of H" to --at the H--;

Line 57, change "L" to --at the L--;

Line 58, change "H" to --at the H--, and change "latch-and-decoders" to --latch and decoders--;

UNITED STATES PATENT AND TRADEMARK OFFICE
CERTIFICATE OF CORRECTION

PATENT NO. : 5,023,647

DATED : June 11, 1991

INVENTOR(S) : Noriaki SHIOMI, et al.

It is certified that error appears in the above-identified patent and that said Letters Patent is hereby corrected as shown below:

COLUMN 8:

Line 47, change "231 Q" to --231, Q--;

Line 50, change "latch-and-decoder" to --latch and decoder--;

Line 52, change "Since a" to --Since an--;

Line 53, change "latch-and-" to --latch and--;

Line 55, change "232, the" to --232, and the--;

Line 57, change "SPL2A-SPL2C (overline)" to --SPL2A-SPL2C--; and

Line 58, "SPL2A-SPL2C" to --SPL2A-SPL2C-- (overline).

COLUMN 9:

Line 2, change "the rising" to --rising--;

Line 11, change "L" to --the L level--;

Line 56, change "capacitor" to --capicators--, and

Line 64, change "resistor 117" to --resistor 107--.

COLUMN 10:

Line 14, change "L" to --at the L--; and

Line 17, change "onstate" to --on-state--.

UNITED STATES PATENT AND TRADEMARK OFFICE
CERTIFICATE OF CORRECTION

PATENT NO. : 5,023,647
DATED : June 11, 1991
INVENTOR(S) : Noriaki SHIOMI, ET AL.

It is certified that error appears in the above-identified patent and that said Letters Patent is hereby corrected as shown below:

COLUMN 11:

Line 21, change "provide" to --provides--;

Line 24, change "238, and the " to --238. The--;

Line 29, change "H" to --at the H--;

Line 31, change "signal" to --signals--;

Line 48, change "the analog" to --and the analog--; and

Line 67, change "SPL2B" (overline) to --SPL2B--.

COLUMN 12:

Line 12, change "gate" to --gates--;

Line 49, change "H" to --at the H--;

Line 53, change "AND gate 230" to --NAND gate 230--, and

Line 54, change "AND gate 219" to --NAND gate 219--.

COLUMN 13:

Line 13, delete "all of";

Line 17, change "is a" to --are--;

Line 34, change "latch-and" to --latch and--;

Line 38, change "duty" to --duty of--;

Line 39, change "level" to --levels--;

Line 48, change "(r/22)" to --$(r/2^2)$--, and

Line 53, change "1 meter" to --3 meters--.

UNITED STATES PATENT AND TRADEMARK OFFICE
CERTIFICATE OF CORRECTION

PATENT NO. : 5,023,647
DATED : June 11, 1991
INVENTOR(S) : Noriaki SHIOMI, et al.

It is certified that error appears in the above-identified patent and that said Letters Patent is hereby corrected as shown below:

COLUMN 14:

Line 5, change "during" to --during which--;

Line 7, change "during" to --during which--;

Line 10, change "during" to --during which--, and

Line 34, change "the non-inverting" to --to the non-inverting--.

COLUMN 15:

Line 29, change "(not shown))." to --(not shown).)--;

Line 59, change "steps" to --step--;

Line 60, delete "of";

Line 61, change "counter light" to --counter-light--;

Line 63, change "counter" to --counter-light--, and

Line 66, change "detected" to --detected that--.

COLUMN 16:

Line 11, change "circuit 16" to --circuit 16.--, and

Line 24, change "H" to --at the H--.

UNITED STATES PATENT AND TRADEMARK OFFICE
CERTIFICATE OF CORRECTION

PATENT NO. : 5,023,647
DATED : June 11, 1991
INVENTOR(S) : Noriaki SHIOMI, et al.

It is certified that error appears in the above-identified patent and that said Letters Patent is hereby corrected as shown below:

COLUMN 17:

Line 3, change "voltage" to --voltages--;

Line 47, delete "an";

Line 48, change "other" to --another--, and

Line 60, change "able" to --possible--.

Signed and Sealed this

Twenty-fourth Day of January, 1995

Attest:

BRUCE LEHMAN

Attesting Officer

Commissioner of Patents and Trademarks